(12) United States Patent
Suzuki et al.

(10) Patent No.: US 10,411,303 B2
(45) Date of Patent: Sep. 10, 2019

(54) BATTERY ELECTROLYTE INCLUDING NON-AQUEOUS SOLVENT

(71) Applicant: Panasonic Intellectual Property Management Co., Ltd., Osaka (JP)

(72) Inventors: Hirotetsu Suzuki, Hyogo (JP); Nobuhiko Hojo, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 177 days.

(21) Appl. No.: 15/604,657

(22) Filed: May 25, 2017

(65) Prior Publication Data

US 2017/0358827 A1 Dec. 14, 2017

(30) Foreign Application Priority Data

Jun. 14, 2016 (JP) ................. 2016-117556

(51) Int. Cl.
 *H01M 10/0569* (2010.01)
 *H01M 10/052* (2010.01)
 *H01M 10/054* (2010.01)
 *H01M 10/0568* (2010.01)

(52) U.S. Cl.
 CPC ..... *H01M 10/0569* (2013.01); *H01M 10/052* (2013.01); *H01M 10/054* (2013.01); *H01M 10/0568* (2013.01); *H01M 2300/0034* (2013.01); *H01M 2300/0037* (2013.01)

(58) Field of Classification Search
 CPC ......... H01M 10/0569; H01M 10/0568; H01M 10/052; H01M 10/054; H01M 2300/0037; H01M 2300/0034
 See application file for complete search history.

(56) References Cited

U.S. PATENT DOCUMENTS

| | | | |
|---|---|---|---|
| 2002/0127475 A1 | 9/2002 | Marchionni et al. | |
| 2016/0028114 A1 | 1/2016 | Pratt et al. | |
| 2016/0226103 A1* | 8/2016 | Teran | H01M 10/0569 |
| 2018/0076485 A1* | 3/2018 | Zhang | H01M 10/0569 |

FOREIGN PATENT DOCUMENTS

| | | |
|---|---|---|
| JP | 2002-305023 | 10/2002 |
| JP | 2006-269374 | * 10/2006 |
| JP | 2006-269374 A | 10/2006 |
| JP | 2013-225497 | 10/2013 |
| JP | 2016-018770 | 2/2016 |
| WO | 2014/204547 A2 | 12/2014 |

OTHER PUBLICATIONS

The Extended European Search Report dated Aug. 9, 2017 for the related European Patent Application No. 17171686.3.

* cited by examiner

*Primary Examiner* — Laura Weiner
(74) *Attorney, Agent, or Firm* — McDermott Will & Emery LLP

(57) ABSTRACT

A battery electrolyte comprises: a non-aqueous solvent including a perfluoropolyether that is functionalized at only one molecule end, the perfluoropolyether including perfluoroalkyl chains and oxygen atoms in such a manner that a perfluoroalkyl chain and an oxygen atom are alternately bound to each other; and a metal salt that is a magnesium salt, an alkaline earth metal salt, or an alkali metal salt, and that is dissolved in the non-aqueous solvent.

14 Claims, 1 Drawing Sheet

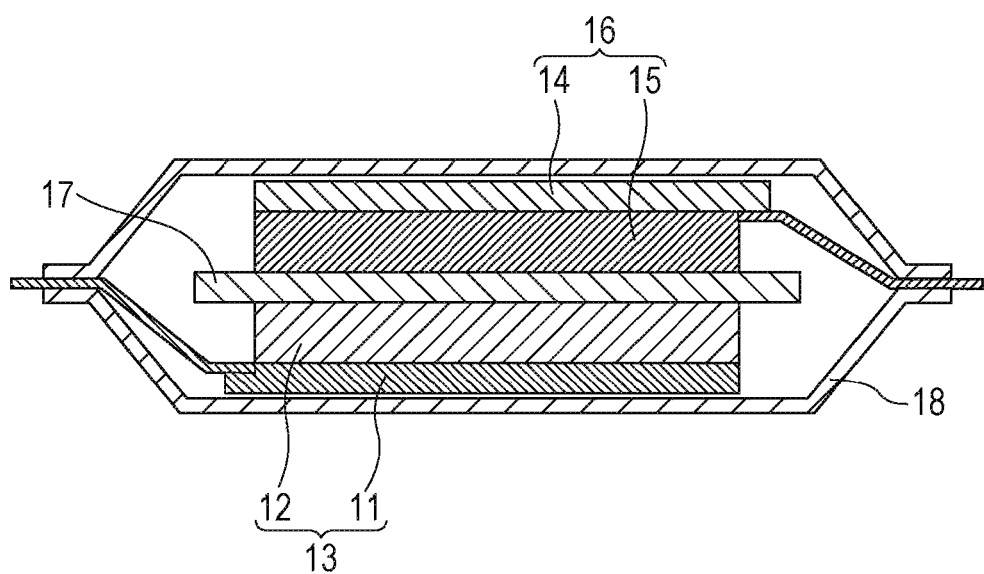

BATTERY ELECTROLYTE INCLUDING NON-AQUEOUS SOLVENT

BACKGROUND

1. Technical Field

The present disclosure relates to battery electrolytes and batteries.

2. Description of the Related Art

Japanese Unexamined Patent Application Publication No. 2006-269374 discloses a lithium ion battery including an electrolyte containing a perfluoropolyether. Japanese Unexamined Patent Application Publication No. 2006-269374 discloses that the perfluoropolyether can be added in an amount in a range of 0.2% to 5% based on the amount of electrolyte.

SUMMARY

One non-limiting and exemplary embodiment provides a safer electrolyte.

In one general aspect, the techniques disclosed here feature a battery electrolyte including: a non-aqueous solvent including a perfluoropolyether that is functionalized at only one molecule end; and a metal salt that is a magnesium salt, an alkaline earth metal salt, or an alkali metal salt. The metal salt is dissolved in the non-aqueous solvent. The perfluoropolyether includes perfluoroalkyl chains and oxygen atoms in such a manner that a perfluoroalkyl chain and an oxygen atom are alternately bound to each other. It should be noted that general or specific embodiments may be implemented as a battery electrolyte, battery, a device, an apparatus, a method, or any selective combination thereof.

According to the present disclosure, a safer electrolyte can be achieved.

Additional benefits and advantages of the disclosed embodiments will become apparent from the specification and drawing. The benefits and/or advantages may be individually obtained by the various embodiments and features of the specification and drawing, which need not all be provided in order to obtain one or more of such benefits and/or advantages.

BRIEF DESCRIPTION OF THE DRAWING

FIGURE is a schematic cross-sectional view of an exemplary battery according to a second embodiment.

DETAILED DESCRIPTION

Embodiments of the present disclosure will be described below. A viewpoint of the inventors will be described first.

Perfluoropolyethers and molecules having perfluoropolyether backbones are poorly compatible with non-aqueous electrolytes. This is disadvantageous in that the amount of perfluoropolyethers or molecules having perfluoropolyether backbones added to non-aqueous electrolytes is limited to a narrow low range. For example, in Japanese Unexamined Patent Application Publication No. 2006-269374, the amount of perfluoropolyether added is limited to not more than 5% based on the amount of electrolyte. Thus, when more than a given amount (e.g., more than 5%) of perfluoropolyether is added to an electrolyte, the perfluoropolyether and the electrolyte will not be homogeneously mixed. As a result, the electrolyte cannot exhibit its properties.

Based on this viewpoint, the inventors have conceived a configuration of the present disclosure.

First Embodiment

A battery electrolyte according to a first embodiment includes a non-aqueous solvent and an alkali metal salt. The alkali metal salt includes an alkali metal cation and an anion. The alkali metal salt is dissolved in the non-aqueous solvent. The non-aqueous solvent contains a perfluoropolyether that is functionalized at only one molecule end. The perfluoropolyether includes a repeating unit in which a perfluoroalkyl chain and oxygen are alternately bound to each other. In the present disclosure, a "perfluoropolyether that is functionalized at only one molecule end" is a compound having the same structure as a perfluoropolyether with no functionalization, except that the compound is functionalized at one molecule end. In the present disclosure, a "perfluoroalkyl chain" includes one or more carbon atoms. Thus, a "perfluoroalkyl chain" may be $CF_2$.

With this configuration, the non-aqueous solvent does not phase-separate even if the electrolyte contains an alkali metal salt. This enables the perfluoropolyether to be mixed with the non-aqueous solvent in any higher proportion, that is, enables a large amount of perfluoropolyether to be homogeneously mixed with the non-aqueous solvent. For example, the volume ratio of the perfluoropolyether to the non-aqueous solvent may be in a range of 10% to 75%. Such a volume ratio, for example, can provide enhanced flame resistance while maintaining the function of the electrolyte. The volume ratio of the perfluoropolyether to the non-aqueous solvent may be 30% or more, desirably 50% or more. Thus, a safer electrolyte can be achieved.

In perfluoropolyethers, which are flame-resistant solvents, electrons fluctuate less easily due to the high electronegativity of fluorine atoms. Thus, perfluoropolyethers have low polarity. Thus, perfluoropolyethers poorly dissolve salts. Thus, perfluoropolyethers cannot dissolve a large amount of salt unlike conventional electrolytes.

The low polarity of perfluoropolyethers may be a factor in their poor compatibility with common organic solvents having high polarity. That is to say, perfluoropolyethers cannot penetrate molecules of organic solvents having high polarity and strong intermolecular force. Thus, perfluoropolyethers and organic solvents cannot be homogeneously mixed. That is to say, from the viewpoint of the internal energy of a substance, a state in which a perfluoropolyether and an organic solvent are phase separated is more stable than a state in which the perfluoropolyether is homogeneously mixed with the organic solvent. Organic solvents having high polarity are stable due to the intermolecular force derived from the polarity. Similarly to this, perfluoropolyethers have stable energy due to the high affinity between fluorine atoms or due to the intermolecular force that increases with an increase in molecular chain length.

The perfluoropolyether according to the first embodiment can cause an interaction with an organic solvent having high polarity. This interaction can increase the effect of homogeneous mixing on energy stabilization.

In the battery electrolyte according to the first embodiment, the perfluoropolyether may be a compound represented by the following formula (1).

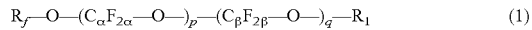

$$R_f\text{—}O\text{—}(C_\alpha F_{2\alpha}\text{—}O\text{—})_p\text{—}(C_\beta F_{2\beta}\text{—}O\text{—})_q\text{—}R_1 \quad (1)$$

In the formula, $R_f$ may be a perfluoroalkyl group and may be linear, branched, or cyclic. $R_1$ may be an alkyl ether, an alkyl carboxylate, or an alkyl carbonate. α and β may be each independently an integer equal to or more than 1 and less than or equal to 3. p and q, each being the number of repeating units, may be each independently an integer equal to or more than 0 and less than or equal to 20.

$R_1$ may be an alkyl carbonate represented by $C_\gamma F_{2\gamma}$—$C_x H_{2x}$—O—C(=O)—O$C_y H_{2y+1}$. In this formula, γ may be 2; x may be 1; and y may be 1. α may be 3, and β may be 3.

This configuration more significantly produces the effect of causing an interaction with an organic solvent having high polarity.

Alternatively, $R_1$ may be an alkyl carboxylate represented by $C_\gamma F_{2\gamma}$—COO—$C_y H_{2y+1}$. In this formula, γ may be 2, and y may be 1. α may be 3, and β may be 3.

This configuration more significantly produces the effect of causing an interaction with an organic solvent having high polarity.

Alternatively, $R_1$ may be an alkyl ether represented by $C_\gamma F_{2\gamma}$—$C_x H_{2x}$—O—$C_y H_{2y+1}$. In this formula, γ may be 2; x may be 1; and y may be 1. α may be 3, and β may be 3.

This configuration more significantly produces the effect of causing an interaction with an organic solvent having high polarity.

As described above, the functionalization of one molecule end of the perfluoropolyether can provide improved compatibility with polar solvents. This allows the repeating unit of the perfluoropolyether not to contain, for example, hydrogen. This can provide both high flame resistance and compatibility with polar solvents.

The repeating unit $(C_\alpha F_{2\alpha}$—O—$)_p$ may be a linear or branched structure. The repeating unit $(C_\beta F_{2\beta}$—O—$)_q$ may be a linear or branched structure, independently of $(C_\alpha F_{2\alpha}$—O—$)_p$. Examples of the linear structure may include (CF$_2$—O—), (CF$_2$CF$_2$—O—), and (CF$_2$CF$_2$CF$_2$—O—). Examples of the branched structure may include (CF(CF$_3$)CF$_2$—O—), (CF$_2$CF(CF$_3$)—O—), and (C(CF$_3$)$_2$—O—).

Examples of —$(C_\alpha F_{2\alpha}$—O—$)_p$—$(C_\beta F_{2\beta}$—O—$)_q$—, which is a combination of repeating units in the formula (1), may include combinations of linear structures as represented by —(CF$_2$CF$_2$CF$_2$—O—)$_p$—(CF$_2$—O—)$_q$—, —(CF$_2$CF$_2$—O—)$_p$—(CF$_2$—O—)$_q$—, and —(CF$_2$CF$_2$CF$_2$—O—)$_p$—(CF$_2$CF$_2$—O—)$_q$—. Examples of —$(C_\alpha F_{2\alpha}$—O—$)_p$—$(C_\beta F_{2\beta}$—O—$)_q$— may further include combinations of a linear structure and a branched structure as represented by —(CF(CF$_3$)CF$_2$—O—)$_p$—(CF$_2$CF$_2$—O—)$_q$—, —(CF(CF$_3$)CF$_2$—O—)$_p$—(CF$_2$CF$_2$CF$_2$—O—)$_q$—, and —(CF$_2$CF(CF$_3$)—O—)$_p$—(CF$_2$CF$_2$—O—)$_q$—. Examples of —$(C_\alpha F_{2\alpha}$—O—$)_p$—$(C_\beta F_{2\beta}$—O—$)_q$ may further include combinations of branched structures as represented by —(CF$_2$CF(CF$_3$)—O—)$_p$—(CF(CF$_3$)CF$_2$—O—)$_q$— and —(C(CF$_3$)$_2$—O—)$_p$—(CF(CF$_3$)CF$_2$—O—)$_q$—. When —$(C_\alpha F_{2\alpha}$—O—$)_p$—$(C_\beta F_{2\beta}$—O—$)_q$ is a combination of two or more repeating units, it may be a block copolymer or a random copolymer.

The battery electrolyte according to the first embodiment is used, for example, in lithium secondary batteries. Thus, in view of typical operating temperatures of lithium secondary batteries, the perfluoropolyether desirably has a boiling point of 60° C. or higher. Such a boiling point can be achieved, for example, when the perfluoropolyether has a weight average molecular weight of approximately 350 or more.

Furthermore, a weight average molecular weight of approximately 2,000 or less, for example, can provide a low weight average molecular weight and a reduced viscosity. The weight average molecular weight of approximately 2,000 or less can also provide reduced intermolecular force.

Thus, in the formula (1), "p" and "q", which are the numbers of repeating units in the perfluoropolyether solvent, and "α" and "β", which are the carbon numbers of perfluoroalkyl chains, are desirably selected such that the weight average molecular weight of the compound is in a range of approximately 350 to 2,000. "p" and "q" are each desirably an integer equal to or more than 0 and less than or equal to 20. The sum of "p" and "q" may be at least 1. "α" and "β" are each desirably an integer equal to or more than 1 and less than or equal to 3. "α" and "β" may be the same.

The perfluoropolyether may be a single compound. Alternatively, the perfluoropolyether may be two or more different compounds.

The perfluoropolyether has a molecular weight distribution. Thus, the actually measured numbers of repeating units "p" and "q" need not be integers.

The weight average molecular weight (Mw) is a molecular weight determined by multiplying the molecular weight of each molecule by the weight of the molecule and dividing the sum of products by the total weight. The weight average molecular weight can be experimentally determined by a measurement called gel permeation chromatography (GPC). This measurement is a type of liquid chromatography that separates analytes on the basis of difference in molecular size and is a technique for determining the molecular weight distribution and the average molecular weight distribution of a macromolecular substance. A combined use of a light scattering detector in this measurement can provide information such as the absolute molecular weight distribution, the weight average molecular weight, and the radius of gyration of the macromolecular substance.

The perfluoropolyether can be synthesized, for example, by a known reaction such as a reaction using photooxidation of a perfluoroolefin or an anionic polymerization reaction of an epoxide of a perfluoroalkane. Products synthesized by these reactions have varied degrees of polymerization (i.e., molecular weights) depending on the extent of the reaction. However, fine distillation or column purification can provide a product having the desired molecular weight.

In the battery electrolyte according to the first embodiment, the non-aqueous solvent may contain at least one selected from the group consisting of phosphates and glyme derivatives.

In the battery electrolyte according to the first embodiment, the non-aqueous solvent may contain a phosphate. The phosphate may contain a compound represented by the following formula (2).

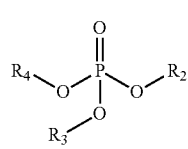

(2)

In the formula, $R_2$ to $R_4$ may each independently represent an aromatic group, an unsaturated aliphatic group, or a saturated aliphatic group. The aromatic group, the unsaturated aliphatic group, and the saturated aliphatic group may each independently contain a halogen atom, a nitrogen atom, an oxygen atom, a sulfur atom, or a silicon atom. The unsaturated aliphatic group and the saturated aliphatic group may be each independently linear or cyclic.

This configuration enables the non-aqueous solvent to sufficiently dissolve the alkali metal salt and further provides the non-aqueous solvent with high ion conductivity. This non-aqueous solvent can provide an electrolyte having high oxidation resistance. This can contribute to charge and discharge reactions of an active material that can provide a high voltage. The high voltage may be a 4 V class voltage.

As described above, the phosphate, which is an aprotic polar solvent, can be used in the first embodiment. The phosphate solvent has a P—O double bond, which is formed by a phosphorus atom P and an oxygen atom O and has a large bond dipole moment. Thus, the phosphate solvent strongly interacts with alkali metal cations and can dissolve a larger amount of alkali metal salt.

The substituents $R_2$ to $R_4$ in the above formula (2) each may be a saturated aliphatic group. All atoms bound to carbon atoms in the saturated aliphatic groups may be hydrogen. Alternatively, atoms bound to carbon atoms in the saturated aliphatic groups may be hydrogen and fluorine. The configuration in which hydrogen and fluorine are bound to carbon atoms in the saturated aliphatic groups is advantageous in terms of electrochemical stability and high interactivity with alkali metal cations. The substituents $R_2$ to $R_4$ in the above formula (2) may be trifluoroethyl groups.

As described above, the presence of fluorine in the non-aqueous solvent can contribute to charge and discharge reactions of an active material that can provide a high voltage. The high voltage may be a 4 V class voltage.

In addition, the presence of fluorine in the polar solvent contained in the non-aqueous solvent can improve the affinity between perfluoropolyether molecules and the polar solvent. This can increase the effect of homogeneous mixing on energy stabilization.

In the battery electrolyte according to the first embodiment, the non-aqueous solvent may contain a glyme derivative. The glyme derivative may contain a compound represented by the following formula (3).

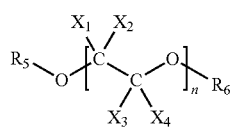

(3)

In the formula, $R_5$ to $R_6$ may each independently represent an aromatic group, an unsaturated aliphatic group, or a saturated aliphatic group. The aromatic group, the unsaturated aliphatic group, and the saturated aliphatic group may each independently contain a halogen atom, a nitrogen atom, an oxygen atom, a sulfur atom, or a silicon atom. The unsaturated aliphatic group and the saturated aliphatic group may independently be linear, branched, or cyclic.

$X_1$ to $X_4$ may be each independently an alkyl group, a hydrogen atom, or a halogen atom. The alkyl group may contain a halogen atom, a nitrogen atom, an oxygen atom, a sulfur atom, or a silicon atom. n may be an integer equal to or more than 1 and less than or equal to 5.

This configuration enables the non-aqueous solvent to sufficiently dissolve the alkali metal salt and further provides the non-aqueous solvent with high ion conductivity. This non-aqueous solvent can provide an electrolyte having high oxidation resistance. This can contribute to charge and discharge reactions of an active material that can provide a high voltage. The high voltage may be a 4 V class voltage.

As described above, the glyme derivative, which is an aprotic solvent, can be used in the first embodiment. The glyme derivative means a glycol diether. The glyme derivative has numbers of C—O bonds, which are formed by carbon atoms C and oxygen atoms O and have large bond dipole moments. For the small rotational barriers of the bonds, the glyme derivative can adopt various conformations. For these reasons, the glyme derivative strongly interacts (i.e., coordinates) with alkali metal cations and dissolves the alkali metal salt. Furthermore, the glyme derivative can sufficiently reduce the surface charge density of alkali metal cations.

$X_1$ to $X_4$ in the above formula (3) may all be hydrogen. Alternatively, $X_1$ to $X_4$ may be hydrogen and fluorine. The configuration in which $X_1$ to $X_4$ are hydrogen and fluorine is advantageous in terms of electrochemical stability and high interactivity with alkali metal cations.

$R_5$ and $R_6$ in the above formula (3) may each independently be a saturated aliphatic group or an aromatic group. When at least one of $R_5$ and $R_6$ is a saturated aliphatic group, the saturated aliphatic group may be an alkyl group or an alkyl group in which one or more hydrogen atoms are substituted with fluorine. The carbon number of the alkyl group is desirably smaller. As the carbon number of the alkyl group decreases, the steric hindrance to the interaction with alkali metal cations can be reduced. For example, the carbon number is desirably 4 or less. When at least one of $R_5$ and $R_6$ is an aromatic group, the aromatic group may be a phenyl group or a phenyl group in which one or more hydrogen atoms are substituted with fluorine. This configuration is advantageous in terms of electrochemical stability and high interactivity with alkali metal cations.

n in the above formula (3) represents the number of repetitions of the ethylene oxide unit. n is desirably 1 to 5, more desirably 1 to 4, most desirably 1. When n is 1, the compound contained in the glyme derivative has a small molecular structure and thus has a low viscosity. This enables alkali metal cations to rapidly diffuse through the electrolyte while allowing the electrolyte to strongly interact with the alkali metal cations. In the battery electrolyte according to the first embodiment, n in the above formula (3) may be 1. $X_1$ may be a trifluoromethyl group. $X_2$ to $X_4$ may be hydrogen atoms. $R_5$ and $R_6$ may be methyl groups.

In the above formula (3), n may be 3. $X_1$ to $X_4$ may be hydrogen atoms. $R_5$ and $R_6$ may be trifluoroethyl groups.

In the above formula (3), n may be 6. $X_1$ to $X_4$ may be hydrogen atoms. $R_5$ may be a methyl group, and $R_6$ may be a tridecafluoroheptyl group.

With this configuration, the electrolyte can contain fluorine. This can contribute to charge and discharge reactions of an active material that can provide a high voltage. The high voltage may be a 4 V class voltage.

In addition, the presence of fluorine in the polar solvent contained in the non-aqueous solvent can improve the affinity between perfluoropolyether molecules and the polar solvent. This can increase the effect of homogeneous mixing on energy stabilization.

In the battery electrolyte according to the first embodiment, the non-aqueous solvent may contain a gelled electrolyte.

The alkali metal salt according to the first embodiment may be represented, for example, by the formula MX. M in the alkali metal salt MX may be an alkali metal. In place of the alkali metal salt MX, a metal salt that is a magnesium salt or an alkaline earth metal salt may be used. This metal salt may include a cation of Be, Mg, or an alkaline earth metal.

Examples of X in the alkali metal salt MX include Cl, Br, I, $BF_4$, $PF_6$, $CF_3SO_3$, $ClO_4$, $CF_3CO_2$, $AsF_6$, $SbF_6$, $AlCl_4$, $N(CF_3SO_2)_2$, $N(FSO_2)_2$, $N(CF_3CF_2SO_2)_2$, and $N(CF_3SO_2)(FSO_2)$. The above-described metal salt that may be used in place of the alkali metal salt MX may also include the above-described X. From the viewpoint of chemical stability, X in the alkali metal salt MX is desirably at least one selected from the group consisting of $BF_4$, $PF_6$, $ClO_4$, $N(CF_3SO_2)_2$, and $N(CF_3CF_2SO_2)_2$. From the viewpoint of solubility, X in the alkali metal salt MX is desirably at least one selected from the group consisting of $N(CF_3SO_2)_2$, $N(FSO_2)_2$, $N(CF_3CF_2SO_2)_2$, and $N(CF_3SO_2)(FSO_2)$.

That is to say, the anion in the battery electrolyte according to the first embodiment may be at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2-CF_2CF_2SO_2-)^-$, and $[N-(SO_2F)-(SO_2CF_3)]^-$.

In the battery electrolyte according to the first embodiment, the alkali metal cation may be a lithium ion or a sodium ion. In the battery electrolyte according to the first embodiment, the alkali metal cation may be replaced with a magnesium ion.

The alkali metal salt may be a single compound or a mixture of two or more compounds.

This configuration can improve the solubility of the alkali metal salt and further provide an electrolyte having high ion conductivity.

Second Embodiment

A second embodiment will now be described. Repetitive descriptions of the first embodiment will be appropriately omitted.

A battery according to the second embodiment includes the battery electrolyte according to the first embodiment, a positive electrode, and a negative electrode. The positive electrode may contain a positive electrode active material capable of occluding and releasing alkali metal cations, magnesium cations, or alkaline earth metal cations. The negative electrode may contain a negative electrode active material capable of occluding and releasing alkali metal cations, magnesium cations, or alkaline earth metal cations. The negative electrode may further contain a negative electrode active material capable of dissolving and precipitating alkali metal cations, magnesium cations, or alkaline earth metal cations.

This configuration can provide a safer battery.

The battery according to the second embodiment can be, for example, a secondary battery. FIGURE is a schematic cross-sectional view of an exemplary battery according to the second embodiment. The battery shown in FIGURE includes a positive electrode 13, a negative electrode 16, a separator 17, and an outer case 18. The positive electrode 13 includes a positive electrode current collector 11 and a positive electrode mixture layer 12 formed thereon. The negative electrode 16 includes a negative electrode current collector 14 and a negative electrode mixture layer 15 formed thereon. The positive electrode 13 and the negative electrode 16 face each other with the separator 17 interposed therebetween.

The battery is formed such that the positive electrode 13, the negative electrode 16, and the separator 17 are covered with the outer case 18. The positive electrode mixture layer 12 may contain a positive electrode active material capable of occluding and releasing alkali metal ions.

Examples of the positive electrode active material will be described below.

When the alkali metal is lithium, the positive electrode active material may be a known material capable of occluding and releasing lithium ions. Specific examples of positive electrode active materials that can be used include transition metal oxides and lithium-containing transition metal oxides. Specific examples of positive electrode active materials that can be used include oxides of cobalt, oxides of nickel, oxides of manganese, and oxides of vanadium exemplified by vanadium pentoxide ($V_2O_5$). The positive electrode active material may be a mixture containing at least one selected from the group consisting of these oxides. The positive electrode active material may be a composite oxide containing at least one selected from the group consisting of cobalt, nickel, manganese, and vanadium.

Examples of positive electrode active materials that can be used include composite oxides containing lithium and transition metals, such as lithium cobalt oxide ($LiCoO_2$). Further examples of positive electrode active materials that can be used include transition metal silicates and transition metal phosphates exemplified by lithium iron phosphate ($LiFePO_4$).

When the alkali metal is sodium, the positive electrode active material may be a known positive electrode active material capable of occluding and releasing sodium ions. Specific examples of positive electrode active materials that can be used include transition metal oxides and sodium-containing transition metal oxides. Specific examples of positive electrode active materials that can be used include oxides of cobalt, oxides of nickel, oxides of manganese, and oxides of vanadium exemplified by vanadium pentoxide ($V_2O_5$). The positive electrode active material may be a mixture containing at least one selected from the group consisting of these oxides. The positive electrode active material may be a composite oxide containing at least one selected from the group consisting of cobalt, nickel, manganese, and vanadium. Further examples of positive electrode active materials that can be used include composite oxides containing sodium and transition metals, such as sodium manganate ($NaMnO_2$). Further examples of positive electrode active materials that can be used include transition metal silicates and transition metal phosphates.

The positive electrode current collector 11 may be a sheet or film that is made of a metal material and that is porous or non-porous. Examples of the metal material include aluminum, stainless steel, and titanium. The metal material may be an alloy containing at least one selected from the group consisting of aluminum, stainless steel, and titanium. Aluminum and alloys thereof are inexpensive and readily processed into thin films. The sheet or film may be a metal foil, a mesh, or others. A carbon material such as carbon may be applied to the surface of the positive electrode current collector 11 in order to (a) reduce resistance, (b) impart catalytic properties, or (c) enhance the bond between the positive electrode mixture layer 12 and the positive electrode current collector 11.

The negative electrode mixture layer 15 may contain a negative electrode active material capable of occluding and releasing alkali metal ions. Examples of the negative electrode active material will be described below.

When the alkali metal is lithium, the negative electrode active material may be a known material capable of occluding and releasing lithium ions. Examples of negative electrode active materials that can be used include elemental lithium metal, lithium metal alloys, carbon materials, and metal oxides. Examples of carbon materials that can be used include graphite, and non-graphite carbon materials such as hard carbon and coke. Examples of metal oxides that can be used include lithium titanate represented by $Li_4Ti_5O_{12}$. Examples of lithium metal alloys that can be used include alloys of lithium and at least one selected from the group consisting of silicon compounds, tin compounds, and aluminum compounds.

When the alkali metal is sodium, the negative electrode active material may be a known material capable of occluding and releasing sodium ions. Examples of negative electrode active materials that can be used include elemental sodium metal, sodium metal alloys, carbon materials, and metal oxides. Examples of carbon materials that can be used include graphite, and non-graphite carbon materials such as hard carbon and coke. Examples of metal oxides that can be used include sodium titanate represented by $Na_2Ti_3O_7$. Examples of sodium metal alloys that can be used include alloys of sodium and at least one selected from the group consisting of tin compounds, germanium compounds, zinc compounds, bismuth compounds, and indium compounds.

The negative electrode current collector 14 may be a sheet or film that is made of a metal material and is porous or non-porous. Examples of the metal material include aluminum, stainless steel, nickel, and copper. The metal material may be an alloy containing at least one selected from the group consisting of aluminum, stainless steel, nickel, and copper. Aluminum and alloys thereof are inexpensive and readily processed into thin films. The sheet or film may be a metal foil, a mesh, or others. To reduce resistance, impart catalytic properties, or enhance the bond between the negative electrode mixture layer 15 and the negative electrode current collector 14, a carbon material such as carbon may be applied to the surface of the negative electrode current collector 14.

The positive electrode mixture layer 12 and the negative electrode mixture layer 15 may each contain a conductive aid, an ion conductor, a binder, and others.

The conductive aid can be used to reduce electrode resistance. Examples of conductive aids that can be used include carbon materials such as carbon black, graphite, and acetylene black; and conductive polymers such as polyaniline, polypyrrole, and polythiophene.

The ion conductor can be used to reduce electrode resistance. Examples of ion conductors that can be used include gelled electrolytes such as poly(methyl methacrylate) and solid electrolytes such as poly(ethylene oxide).

The binder can be used to improve the binding properties of the materials constituting the electrode. Examples of binders that can be used include poly(vinylidene fluoride), vinylidene fluoride-hexafluoropropylene copolymers, vinylidene fluoride-tetrafluoroethylene copolymers, polytetrafluoroethylene, carboxymethylcellulose, poly(acrylic acid), styrene-butadiene rubber, polypropylene, polyethylene, and polyimide.

The separator 17 may be a porous membrane made of, for example, polyethylene, polypropylene, glass, cellulose, or ceramic. The porous membrane can be used with its pores impregnated with an electrolyte.

EXAMPLES

Electrolytes of Examples and Comparative examples, methods for producing batteries including the electrolytes, and results of evaluation of the batteries will be described below. All the electrolytes of Examples were prepared in an argon glove box. It should be noted that Examples described below is not intended to limit the configuration of the present disclosure.

Example 1

A non-aqueous electrolyte was prepared using a perfluoropolyether, a phosphate solvent, and an alkali metal salt.

The perfluoropolyether used was perfluoro(2,5-dimethyl-3,6-dioxanonanoic acid) methyl ester represented by the above formula (1) wherein p is 0; q is 1; β is 3; $R_1$ is an alkyl carboxylate represented by $C_\gamma F_{2\gamma}$—COO—$C_y H_{2y+1}$ (where γ is 2, and y is 1); and $R_f$ is $CF_2$—$CF_2$—$CF_3$.

The phosphate solvent used was a fluorinated phosphate. Specifically, TFEP, i.e., a compound represented by the above formula (2) wherein the substituents $R_2$ to $R_4$ are trifluoroethyl groups ($CF_3$—$CH_2$—) was used.

The alkali metal salt used was lithium bis(fluorosulfonyl)imide ($LiN(FSO_2)_2$).

The perfluoropolyether and the phosphate were mixed in a volume ratio of 1 to 1 to prepare a mixed solvent, and the alkali metal salt was dissolved in the mixed solvent.

The Li-ion concentration in the whole non-aqueous electrolyte was 0.2 molar concentration.

In this manner, the non-aqueous electrolyte of Example 1 was obtained.

Example 2

A non-aqueous electrolyte was prepared in the same manner as in Example 1 except that the phosphate solvent was replaced with a glyme derivative.

The glyme derivative used was a compound represented by the above formula (3) wherein n is 1; $X_1$ is a trifluoromethyl group; $X_2$ to $X_4$ are hydrogen atoms; and $R_5$ and $R_6$ are methyl groups.

The Li-ion concentration in the whole non-aqueous electrolyte was 0.2 molar concentration.

In this manner, the non-aqueous electrolyte of Example 2 was obtained.

Example 3

A compound represented by the above formula (3) wherein n is 3; $X_1$ to $X_4$ are hydrogen atoms; and $R_5$ and $R_6$ are trifluoroethyl groups was used as a glyme derivative. Except for this, the same procedure as in Example 2 was conducted to prepare a non-aqueous electrolyte.

The Li-ion concentration in the whole non-aqueous electrolyte was 0.2 molar concentration.

In this manner, the non-aqueous electrolyte of Example 3 was obtained.

Example 4

A compound represented by the above formula (3) wherein n is 6; $X_1$ to $X_4$ are hydrogen atoms; $R_5$ is a methyl group; and $R_6$ is a tridecafluoroheptyl group was used as a glyme derivative. Except for this, the same procedure as in Example 2 was conducted to prepare a non-aqueous electrolyte.

The Li-ion concentration in the whole non-aqueous electrolyte was 0.2 molar concentration.

In this manner, the non-aqueous electrolyte of Example 4 was obtained.

Comparative Example 1

A perfluoropolyether in which neither molecule end is functionalized (Galden HT-80 available from Solvay Specialty Polymers) was used. That is to say, the perfluoropolyether used in Comparative Example 1 was a perfluoropolyether terminated with trifluoromethyl at both molecule ends.

Except for this, the same procedure as in Example 1 was conducted to obtain a non-aqueous electrolyte of Comparative Example 1.

Comparative Example 2

The same perfluoropolyether as in Comparative Example 1 was used.

Except for this, the same procedure as in Example 2 was conducted to obtain a non-aqueous electrolyte of Comparative Example 2.

Comparative Example 3

The same perfluoropolyether as in Comparative Example 1 was used.

Except for this, the same procedure as in Example 3 was conducted to obtain a non-aqueous electrolyte of Comparative Example 3.

Comparative Example 4

The same perfluoropolyether as in Comparative Example 1 was used.

Except for this, the same procedure as in Example 4 was conducted to obtain a non-aqueous electrolyte of Comparative Example 4.

Evaluation of Compatibility and Conductivity

The non-aqueous electrolytes of Examples 1 to 4 and Comparative Examples 1 to 4 were visually evaluated for compatibility. The conductivity of homogeneously mixed non-aqueous solvents was measured. The measurement of conductivity was carried out at 25° C.

Table 1 shows the evaluation results of compatibility and conductivity of Examples 1 to 4 and Comparative Examples 1 to 4.

metal salt, exhibited no solvent-solvent phase separation or precipitation of the alkali metal salt and thus were homogeneous solvents.

In addition, in the non-aqueous electrolytes of Examples 1 to 4, each containing a perfluoropolyether functionalized at one molecule end, the volume ratio of each perfluoropolyether was 50%, that is, each perfluoropolyether was homogeneously mixed in a larger ratio than in conventional cases.

By contrast, the non-aqueous electrolytes of Comparative Examples 1 to 4, in each of which a perfluoropolyether functionalized at neither molecule end (i.e., terminated with fluoroalkyl at both molecule ends) was used, were not homogeneous solutions and showed phase separation.

Therefore, it was confirmed that a functional group introduced into one molecule end of a perfluoropolyether is effective in dissolving an alkali metal salt and providing a homogeneous solution.

These results show that the battery electrolyte according to the present disclosure can provide a safer electrolyte.

The electrolyte according to the present disclosure can be used as a battery electrolyte.

What is claimed is:

1. A battery electrolyte comprising:
   a non-aqueous solvent including a perfluoropolyether that is functionalized at only one molecule end, the perfluoropolyether including perfluoroalkyl chains and oxygen atoms in such a manner that a perfluoroalkyl chain and an oxygen atom are alternately bound to each other; and
   a metal salt that is a magnesium salt, an alkaline earth metal salt, or an alkali metal salt, and that is dissolved in the non-aqueous solvent,
   wherein the perfluoropolyether is a compound represented by formula (1):

$$R_f\text{—}O\text{—}(C_\alpha F_{2\alpha}\text{—}O\text{—})_p\text{—}(C_\beta F_{2\beta}\text{—}O\text{—})_q\text{—}R_1 \quad (1)$$

where $R_f$ is a perfluoroalkyl group and is linear, branched, or cyclic; $R_1$ is an alkyl ether, an alkyl carboxylate, or an alkyl carbonate; and p and q, each being the number

TABLE 1

| | Molecule End Structure of Perfluoropolyether | Solvent | Volume Ratio of Perfluoropolyether [%] | Compatibility | Conductivity [$10^{-6}$ S/cm] |
|---|---|---|---|---|---|
| Example 1 | Methyl ester | Fluorinated phosphate | 50 | Good | 100 |
| Example 2 | | Glyme derivative | 50 | Good | 62 |
| Example 3 | | | 50 | Good | 160 |
| Example 4 | | | 50 | Good | 49 |
| Comparative Example 1 | Trifluoromethyl | Fluorinated phosphate | 50 | Poor | — |
| Comparative Example 2 | | Glyme derivative | 50 | Poor | — |
| Comparative Example 3 | | | 50 | Poor | — |
| Comparative Example 4 | | | 50 | Poor | — |

"Good" in the "Compatibility" column in Table 1 means that precipitation of an alkali metal salt or solvent-solvent phase separation was not observed. "Poor" in the "Compatibility" column in Table 1 means that precipitation of an alkali metal salt or solvent-solvent phase separation was observed.

As shown in Table 1, the non-aqueous electrolytes of Examples 1 to 4, each containing a perfluoropolyether having a functional group at one molecule end and an alkali of repeating units, are each independently an integer equal to or more than 0 and less than or equal 20;
   wherein the sum of p and q is at least 1;
   $\alpha$ is 3; and
   $\beta$ is 3,
   wherein the non-aqueous solvent includes a glyme derivative.

2. The battery electrolyte according to claim 1, wherein the metal salt is an alkali metal salt.

3. The battery electrolyte according to claim 2,
wherein a volume ratio of the perfluoropolyether to the non-aqueous solvent is in a range of 10% to 75%.

4. The battery electrolyte according to claim 2,
wherein the perfluoropolyether has a weight average molecular weight in a range of 350 to 2,000.

5. The battery electrolyte according to claim 1,
wherein the metal salt includes an alkali metal cation and an anion, and the anion is at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2$—$CF_2CF_2SO_2$—$)^-$, and $[N$—$(SO_2F)$—$(SO_2CF_3)]^-$.

6. The battery electrolyte according to claim 1,
wherein the metal salt includes an alkali metal cation and an anion, and the alkali metal cation is a lithium ion or a sodium ion.

7. The battery electrolyte according to claim 1,
wherein $R_1$ is an alkyl carbonate represented by $C_\gamma F_{2\gamma}$—$C_x H_{2x}$—$O$—$C(=O)$—$OC_y H_{2y+1}$;

γ is 2;

x is 1; and y is 1.

8. The battery electrolyte according to claim 1,
wherein $R_1$ is an alkyl carboxylate represented by $C_\gamma F_{2\gamma}$—$COO$—$C_y H_{2y+1}$;

γ is 2; and y is 1.

9. The battery electrolyte according to claim 1,
wherein $R_1$ is an alkyl ether represented by $C_\gamma F_{2\gamma}$—$C_x H_{2x}$—$O$—$C_y H_{2y+1}$;

γ is 2;

x is 1; and y is 1.

10. The battery electrolyte according to claim 1,
wherein the glyme derivative includes a compound represented by formula (3):

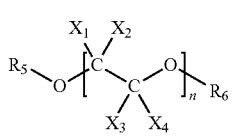
(3)

where $R_5$ and $R_6$ each independently represent an aromatic group, an unsaturated aliphatic group, or a saturated aliphatic group; the aromatic group, the unsaturated aliphatic group, and the saturated aliphatic group each include a halogen atom, a nitrogen atom, an oxygen atom, a sulfur atom, or a silicon atom; the unsaturated aliphatic group and the saturated aliphatic group are each linear, branched, or cyclic; $X_1$ to $X_4$ are each independently an alkyl group, a hydrogen atom, or a halogen atom; the alkyl group includes a halogen atom, a nitrogen atom, an oxygen atom, a sulfur atom, or a silicon atom; and n is an integer equal to or more than 1 and less than or equal to 5.

11. The battery electrolyte according to claim 10,
wherein the glyme derivative is represented by formula (3):

(3)

where n is 1;

$X_1$ is a trifluoromethyl group;

$X_2$ to $X_4$ are hydrogen atoms; and $R_5$ and $R_6$ are methyl groups.

12. The battery electrolyte according to claim 10,
wherein the glyme derivative is represented by formula (3):

(3)

where n is 3;

$X_1$ to $X_4$ are hydrogen atoms; and $R_5$ and $R_6$ are trifluoroethyl groups.

13. The battery electrolyte according to claim 10,
wherein the glyme derivative is represented by formula (3):

(3)

where n is 6;

$X_1$ to $X_4$ are hydrogen atoms;

$R_5$ is a methyl group; and $R_6$ is a tridecafluoroheptyl group.

14. A battery comprising:
a battery electrolyte including an alkali metal salt and a non-aqueous solvent, the alkali metal salt including an alkali metal cation and an anion;

a positive electrode including a positive electrode active material capable of occluding and releasing the alkali metal cation; and a negative electrode including a negative electrode active material capable of occluding and releasing the alkali metal cation, wherein the alkali metal salt is dissolved in the non-aqueous solvent; and the non-aqueous solvent includes a perfluoropolyether, wherein the perfluoropolyether is a compound represented by formula (1):

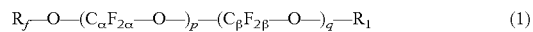
(1)

where $R_f$ is a perfluoroalkyl group and is linear, branched, or cyclic; $R_1$ is an alkyl ether, an alkyl carboxylate, or an alkyl carbonate; α and β are each independently an integer equal to or more than 1 and less than or equal to 3; and p and q, each being the number of repeating units, are each independently an integer equal to or more than 0 and less than or equal 20,
wherein the sum of p and q is at least 1;
α is 3; and
β is 3,
wherein the non-aqueous solvent includes a glyme derivative.

* * * * *